Inventors
John Maurice Towler
Frank Hathorn Towler

Inventors
John Maurice Towler
Frank Hathorn Towler
ATTORNEYS

Inventors
John Maurice Towler
Frank Hathorn Towler

ATTORNEYS

United States Patent Office 2,696,832
Patented Dec. 14, 1954

2,696,832

HYDRAULIC CONTROL VALVE

John Maurice Towler, Rodley, near Leeds, and Frank Hathorn Towler, Dob Park, near Otley, England, assignors to Electraulic Presses Limited, Rodley, England, a corporation of England Application July 19, 1951, Serial No. 237,586

Claims priority, application Great Britain July 24, 1950

7 Claims. (Cl. 137—620)

This invention relates to hydraulic control valves, especially those intended for operating hydraulic presses which are served by a pump with or without the interposition of a hydraulic accumulator.

In the modern oil hydraulic system it is customary and convenient to use piston valves for controlling the motion of presses, but there is a definite upper limit to the size of such valves, particularly in terms of horse power controlled. Thus low pressure piston valves can be made in larger sizes than high pressure piston valves, but in practice the horse power limit is about the same. It is therefore necessary, for controlling very large high speed presses, to employ either a multiplicity of piston valves or large seated valves, and one object of this invention is to provide a very simple construction of seated valve which can be either manually or pilot operated. As the admission and exhaust features of such seated valves have to be entirely separate, they are usually synchronized by means of a lever which in large valves is extremely heavy, and a second object of this invention is to provide a simple hydraulic synchronization of the two essential members. A third object of the invention is to provide a construction whereby a moving valve member is guided at one end either in the seat itself or in a member attached directly to the seat, whilst at the other end and at a distance much more remote from the seat than the first guide it is guided by a short piston moving in a cylinder integral with the main valve block, and in which cylinder, or in a bore concentric therewith, the seat is registered by means of a concentric spigot. Alternatively the moving valve member may be guided wholly in the valve seat or in a member attached directly thereto and the operation piston may be flexibly attached to it.

Broadly the present invention consists of an hydraulic admission and exhaust control valve having independent inlet and exhaust valves wherein the inlet valve is held closed by hydraulic pressure, said pressure being applied and released by a further valve which is under the control of an operator so that in one position of the further valve both the inlet valve and the exhaust valve are closed, in another position of said valve the exhaust valve is held open and the inlet valve held closed and in a further position of said valve the exhaust valve is closed and the inlet valve is open.

In one embodiment of the invention both the inlet and exhaust valves are of the mushroom type and the inlet valve is held closed against the inlet pressure by a piston under opposing hydraulic pressure. In this embodiment the pressure against the piston is admitted and released by a manually or mechanically operated pilot valve the valve member of which is utilised to lift the exhaust valve from its seat.

In order that the invention may be clearly understood and carried into effect three embodiments of the same will now be described by aid of the accompanying drawings in which.

Figure 1:
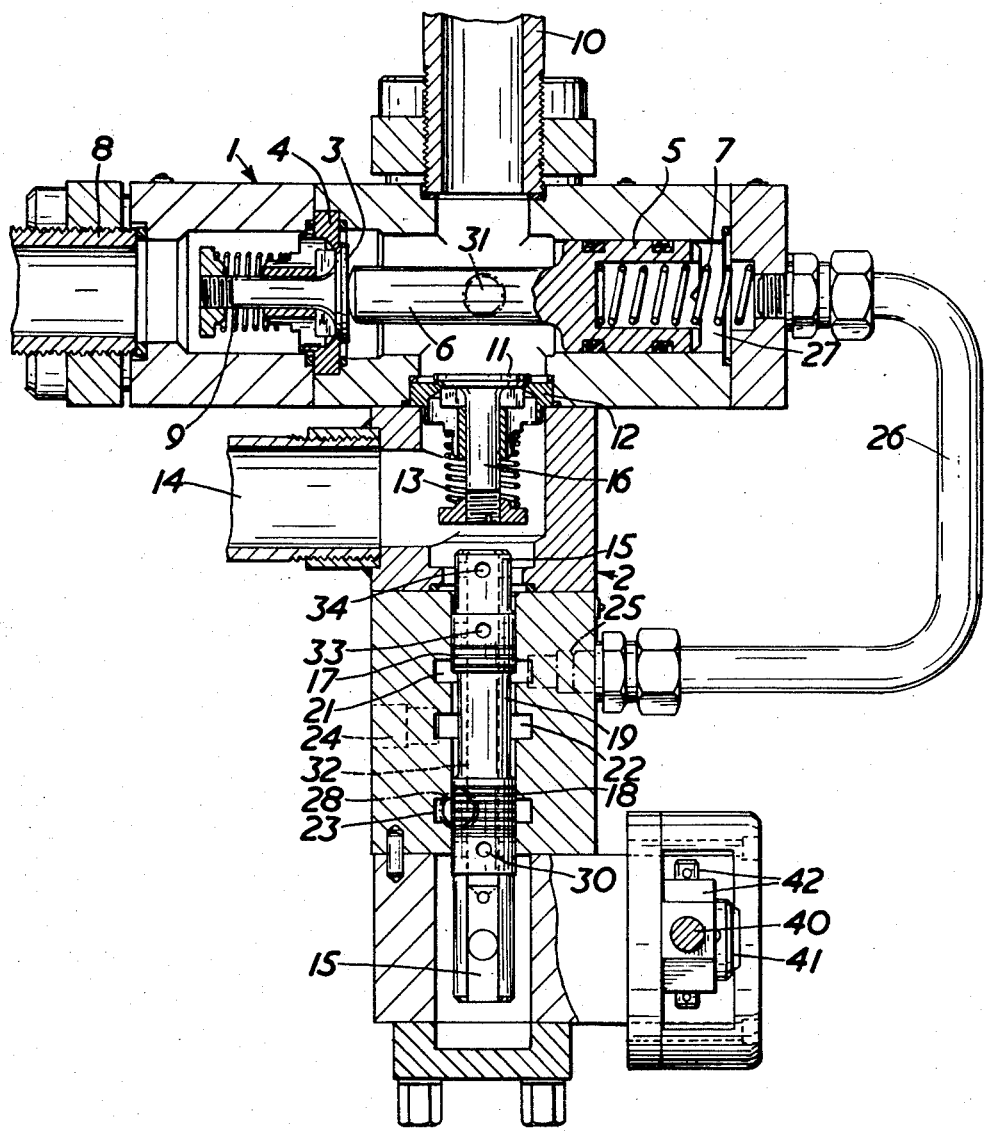
Fig. 1 is a view partly in section and partly in elevation of a hand operated control admission and exhaust valve according to one embodiment of the invention.

In general the control valve illustrated in the drawings has a body consisting of two main portions 1 and 2, each made up of three united sections and arranged at right angles to each other.

The portion 1, shown as horizontal in the drawings has a hollow interior and contains within one end a mushroom type inlet valve 3 and a seating 4 therefor, and within the opposite end a slidable piston 5 with an elongated stem 6 projecting from its inner end so as to press against the opposing face of the mushroom valve 3. The contact between the stem 6 and the valve 3 is maintained by means of a spring 7 which tends to urge the piston 5 to move in the direction of the valve 3.

Pressure liquid from a pump or accummulator is admitted into the interior of the body portion 1 behind the inlet valve 3 through a connection 8. The pressure of this liquid therefore tends to force the valve 3 inwards off its seat 4 against the pressure of a closing spring 9. The inward or opening movement of the inlet valve 3 is, however, dependent upon the resistance which may be offered by the piston 5 through the stem 6. As the effective area of the piston 5 is greater than the area of the inlet valve against which, when closed, the pressure liquid is permitted to act, it is only necessary to admit liquid at the same pressure to the right hand side of the piston 5 for such piston to operate to hold the inlet valve closed.

Assuming that the inlet valve is free to open under the pressure of the liquid entering through the connection 8, it will flow to the press or cylinder, or other hydraulic motor to be operated, by way of an outlet connection 10.

The other body portion 2, shown in a vertical position in Fig. 1, is also provided with a hollow interior and within the upper end thereof, and below the outlet connection 10, is an upwardly opening mushroom type exhaust valve 11 which, normally, is held closed on its seating 12 by a spring 13. When this exhaust valve is opened the press cylinder is permitted to exhaust its liquid through an exhaust connection 14.

In the example illustrated the exhaust valve 11 is lifted off its seat by a plunger type pilot valve 15. For this purpose this pilot valve is required to have imparted to it an upward movement sufficient firstly to bring its upper end into contact with the opposing end of the stem 16 of the exhaust valve and for this upward movement to be continued until the valve has been lifted, sufficiently, from its seat.

Figure 2:
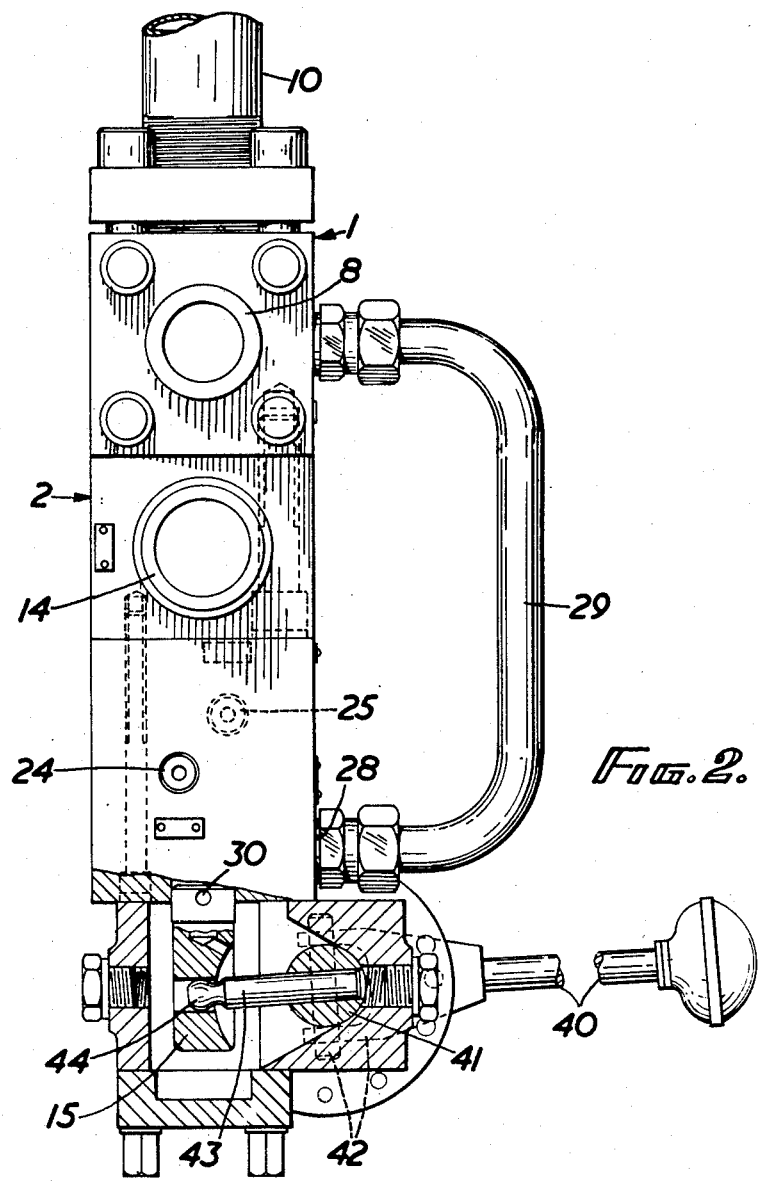
Fig. 2 is a view, also partly in section, of Fig. 1 when looking towards the left hand side of the valve.

The pilot valve 15 as shown in Fig. 1 has upper and lower full diameter positions 17 and 18 separated by a portion 19 of reduced diameter and said portions 17 and 18 are a close sliding fit within a bore 20 in the body portion 2. The bore 20 is formed with three longitudinally spaced annular grooves 21, 22 and 23. The middle annular groove 22 is adapted to be supplied with pressure liquid from the pump or accumulator through an inlet connection 24, the upper annular groove is connected by way of connection 25 and pipe 26 to a space 27 on the outer side of the piston 5 and the lower annular groove 23 is connected by way of connection 28, pipe 29, and opening 31, see Fig. 2, to the interior of the central section of the body portion 1.

With the pilot valve 15 in the neutral position as in Fig. 1 the annular grooves 21, 22, are bridged by the reduced portion 19 and in consequence pressure liquid is permitted to flow from inlet connection 24, through pipe 26 to space 27 at the outer end of piston 5. The pressure thus applied to piston 5 acts to hold the inlet valve 3 closed against the pressure on the opposite or inlet side, as for one thing the area of the piston open to the space 27 is greater than the area of the annulus on the opposite or inner side of the piston and for another thing such first area is greater than the effective opening pressure area of the inlet valve 3.

In this neutral position of the pilot valve 15 the exhaust valve 11 is closed thus isolating the connection 10 from the exhaust outlet 14, and the lower annular chamber 23 is shut off by the full diameter portion 18.

To exhaust the press cylinder the pilot valve 15 is moved towards the stem 16 of the exhaust valve 11 until it contacts the end of the stem; further movement of the pilot valve in the same direction therefore lifts the exhaust valve from its seat and allows liquid from the press cylinder to flow, by way of connection 10, past the exhaust valve and out through connection 14.

In consequence of this upward movement of the pilot valve, ports 30 in the valve are brought into registration with the annular groove 23 before the pilot valve contacts and lifts the exhaust valve 11. Some of the liquid being exhausted is thereby caused to by-pass the exhaust valve 11 and to escape through opening 31 in the central section of the valve body portion 1, to annular groove 23 by way of pipe 29, up through a passage 32 in the interior of the valve 15, out through the upper set 34 of further ports 33 and 34 in the upper end of the valve and so to exhaust through connection 14. This by-passing of a portion of the exhausting liquid is useful in counteracting harmful surge, as it lowers the pressure of the liquid to be exhausted before the main exhaust occurs.

Figure 3:
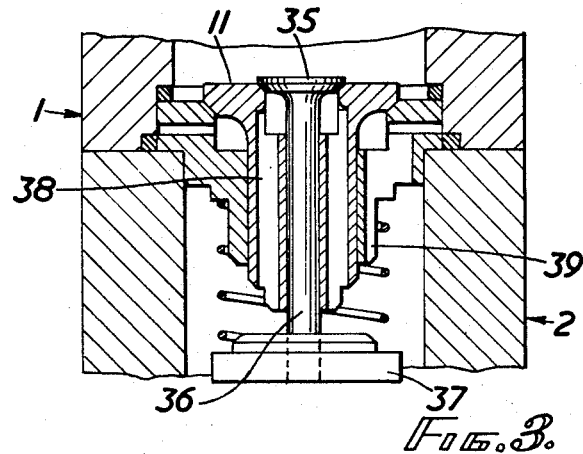
Fig. 3 is a detail view, partly in section illustrating an example of a compounded form of the exhaust valve of Fig. 1.

Harmful surge may also be prevented by employing a compound form of exhaust valve instead of the simple exhaust valve 11 shown in Fig. 1. An example of such an alternative construction is shown in Fig. 3 and as shown this consists of a small mushroom valve 35 mounted concentrically within the main valve 11. The stem 36 of this small valve projects below the stem of the main valve 11, which in this example is annular, and in consequence this stem 36 is the one which will be contacted by the upper or inner end of the pilot valve 15. The small valve 35 will thus be the first to open and by fitting a washer 37 of required diameter on the lower end of its stem the continued upward movement of the small valve will effect the later opening of the main exhaust valve 11. This construction will also have the advantage that a much smaller load is required successively to lift the two valves from their seats.

The liquid released upon opening the two valves will flow to exhaust by way of passages 38 in the case of the small valve and further passages 39 in the case of the larger valve.

In the valve illustrated the pilot valve 15 is operated by hand through a lever 40. The angular motion of this lever is imparted as a straight line motion to the end of the pilot valve by a connection comprising an intermediate rock shaft 41 with one end of which the lever 40 connects through a forked joint 42. The connection between the other end of this rock shaft 41 and the pilot valve consists of a diametrical pin 43 and a ball joint 44.

Alternatively, but not shown, the pilot valve may be operated through a servo-motor.

To permit the inlet valve 3 to open, pressure within the space 27 is released by opening said space to exhaust. This is effected when the pilot valve 15 is moved down to bring the ports 33 into registration with the annular groove 21. The liquid within space 27 is then free to flow up the interior of the pilot valve and out through exhaust connection 14.

Figure 4:
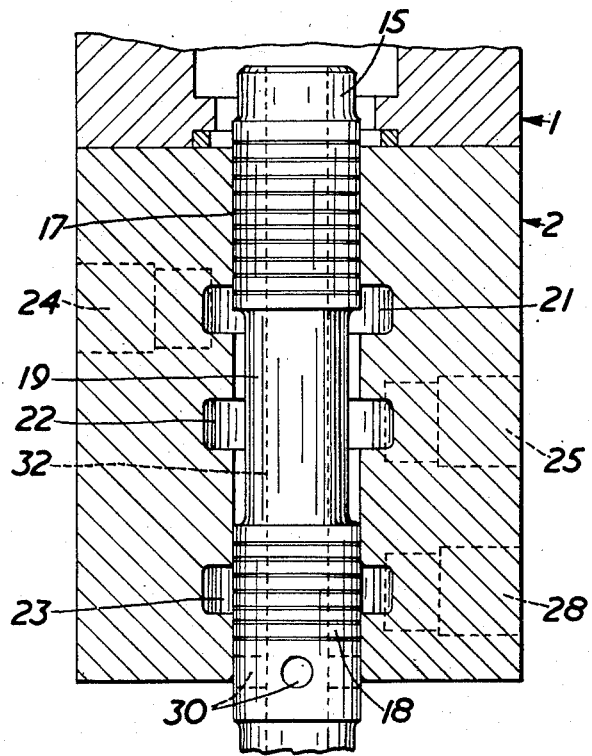
Fig. 4 is also a detail view partly in section showing an alternative arrangement of pilot valve and port connections.

In an alternative porting arrangement for the pilot valve 15 shown in Fig. 4 the upper annular groove 21 is in constant communication with the pressure inlet 24, whilst the intermediate and lower annular grooves 22 and 23 are open to outlet connection 25, leading to space 27 and 28, leading to opening 31, respectively. By this arrangement, with the pilot valve 15 in either the "Neutral" or "Exhaust" positions the inlet pressure will act on piston 5 and hold the inlet valve 3 closed. When the pilot valve is moved downwards to the "Press" position, with the inlet valve 3 free to open, a connection between the inlet 8 and the outlet 10 to the press is made, thus augmenting the flow past the inlet valve 3.

To summarise the operation of the valve illustrated in Fig. 1 when the pilot valve is in the "Neutral" position shown, the piston 5 is under pressure and the inlet valve 3 is held closed. The exhaust valve 11 is also closed. Pressure liquid is therefore locked in the press cylinder. When the pilot valve is moved upwards to its limit or "Exhaust" position the exhaust valve 11 is held open and the inlet valve 3 is still held closed. Upon movement of the pilot valve to the extreme lowered, or "Press" position the exhaust valve 11 closes, the pressure within space 27 is released through ports 33, and the inlet valve 3 opens, thus allowing pressure liquid to pass to the press through connection 10.

We claim:
1. An hydraulic admission and exhaust control valve structure comprising in combination, a casing having a delivery chamber with a service outlet, a pressure inlet and an exhaust outlet, a normally-closed inlet valve controlling said inlet and adapted to open in response to the inlet liquid pressure so as to admit pressure liquid to said chamber, a hydraulic piston arranged when under pressure to act mechanically against said inlet valve in a direction to bias said inlet valve toward and normally maintain it in closed position, a normally-closed exhaust valve controlling said exhaust outlet and when open serving to release pressure liquid from said chamber, and a pilot valve controlling said inlet valve and said exhaust valve, said pilot valve having a pressure inlet port, a by-pass port connected to said chamber and a control port connected to open to the inlet valve closing pressure area of said piston, and having a slidable spool valve plunger movable selectively into any one of neutral, exhaust and press positions, said plunger being operative to connect said control port to said inlet port while in either neutral or exhaust position and to exhaust while in press position, to mechanically open said exhaust valve while in exhaust position, and to connect said by-pass port to said inlet port while in press position and to exhaust while in exhaust position.

2. An hydraulic admission and exhaust control valve structure comprising, in combination, an inlet valve of the mushroom type and adapted to open automatically under the pressure of the hydraulic supply and normally held closed against this pressure by an opposing hydraulic pressure, an exhaust valve independent of said inlet valve and having a stem and a further valve of the reciprocable plunger type under the control of an operator for directing pressure fluid for applying and releasing said opposing pressure and which in movement toward exhaust position serves to contact the stem of said exhaust valve and to lift the same from its seating so that in one position of said further valve, both said inlet valve and said exhaust valve are closed, in another position of said further valve said exhaust valve is held open and said inlet valve is held closed, and in another position of said further valve said exhaust valve is closed and said inlet valve is open.

3. An hydraulic admission and exhaust control valve comprising a valve body having in it an inlet for pressure liquid, a press outlet for conveying said liquid to and from an hydraulic press and an exhaust outlet, a mushroom inlet valve for isolating the pressure liquid from the press outlet, a further valve for isolating the press outlet from the exhaust outlet, an hydraulic piston adapted, when under opposing pressure, to hold the inlet valve closed and a pilot valve the movement of which is adapted to be under the control of an operator, said pilot valve having "neutral," "exhaust" and "press" positions and comprising a plunger having a portion of reduced diameter and a portion of full diameter which portions are movable in relation to two annular grooves one of which communicates with the pressure liquid supply and the other communicates with the outer end of a cylinder containing the hydraulic piston, the arrangement being such that when the pilot valve plunger is in the "neutral" position the portion of reduced diameter bridges the two annular grooves and permits pressure liquid to enter the cylinder containing the hydraulic piston, and when the pilot valve plunger is in the "exhaust" position the two annular grooves are still bridged by the portion of reduced diameter, whilst the forward end of the pilot valve plunger is in contact with and has lifted the exhaust valve from its seat, and when the pilot valve plunger is in the "press" position the two annular grooves are isolated from each other by the portion of full diameter on the pilot valve plunger and the annular groove that communicates with the cylinder containing the hydraulic piston registers with a port in the pilot valve plunger which leads to exhaust.

4. An hydraulic admission and exhaust control valve according to claim 2 wherein the exhaust valve is of the compound type having a smaller mushroom valve working within the main or larger valve, said smaller valve having a stem which extends beyond the stem of the main valve, whereby the smaller valve is opened in advance of the main valve.

5. An hydraulic admission and exhaust control valve structure comprising, in combination, a delivery chamber with a service outlet, a pressure inlet adapted for connection to a source of pressure liquid and an exhaust outlet adapted for connection to exhaust, a normally spring-closed inlet valve for controlling said inlet and adapted to open in response to the inlet liquid pressure and in the direction of the liquid flow therethrough, a normally spring-closed exhaust valve for controlling said exhaust outlet and adapted to open in a direction opposite to that of the liquid flow therethrough, a hydraulic piston arranged when under pressure to act mechanically against said inlet valve in a direction to bias said inlet valve into closed position, and a pilot valve having an inlet port adapted for connection to said pressure liquid source, a by-pass port connected to said chamber and a control port connectable to pressure area of said piston and having a slidable spool valve plunger movable selectively into any one of "neutral," "exhaust," and "press" positions, said plunger being operative in neutral and exhaust positions to interconnect said inlet and control ports and upon movement into exhaust position first to connect said by-pass port to exhaust and then to open said exhaust valve by physical abutment, and in press position to connect said control port to exhaust and to interconnect said inlet and by-pass ports.

6. An hydraulic admission and exhaust control valve structure comprising, in combination, a housing having an elongated chamber with a service outlet and defining a hydraulic cylinder at one end and a pressure liquid inlet passage at the other end, a spring-closed inlet valve of the mushroom type for controlling the flow of liquid from said passage to said service outlet, said inlet valve being adapted to open in response to the liquid pressure in said passage and to open in the direction of liquid flow therethrough, a hydraulic piston reciprocable in said cylinder and having a stem spring-urged into axial abutment with the valve member of said inlet valve in a direction to oppose the action of said pressure, pilot valve means having connections with the liquid source supplying said inlet passage and with an exhaust, said pilot valve being selectively operable either to connect said cylinder to the pressure source whereby to hold said inlet valve closed, or to exhaust whereby to permit said inlet valve to open, and means for connecting said chamber to exhaust while maintaining pressure in said cylinder.

7. An hydraulic admission and exhaust control valve structure comprising, in combination, a delivery chamber with a service outlet, a pressure inlet adapted for connection to a source of pressure liquid and an exhaust outlet adapted for connection to exhaust, a normally spring-closed inlet valve for controlling said inlet and adapted to open in response to the inlet liquid pressure and in the direction of the liquid flow therethrough, a normally spring-closed exhaust valve for controlling said exhaust outlet and adapted to open in a direction opposite to that of the liquid flow therethrough, a hydraulic piston arranged when under pressure to act mechanically in a direction to bias said inlet valve into closed position, and a pilot valve having an inlet port adapted for connection to said pressure liquid source, and a control port connected to the pressure area of said piston and having a slidable spool valve plunger movable selectively into any one of "neutral," "exhaust" and "press" positions, said plunger being operative in neutral and exhaust positions to interconnect said inlet and control ports and upon movement into exhaust position to open said exhaust valve by mechanical abutment, and in press position to connect said control port to exhaust.

References Cited in the file of this patent
UNITED STATES PATENTS

| Number | Name | Date |
|---|---|---|
| 1,777,611 | Grohek | Oct. 7, 1930 |
| 2,211,319 | Camerota | Aug. 13, 1940 |
| 2,426,065 | Stevens | Aug. 19, 1947 |